Dec. 18, 1945.  E. VAN SCHAACK  2,391,207
ELECTRIC HEATER
Filed Jan. 4, 1944
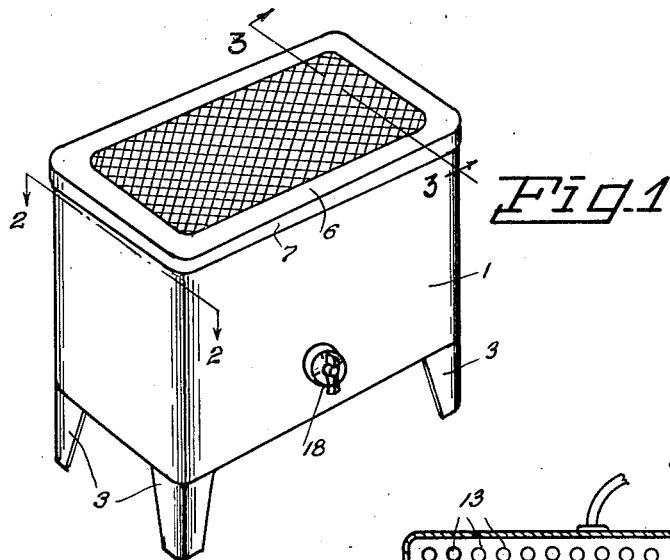
Fig.1
Fig.2
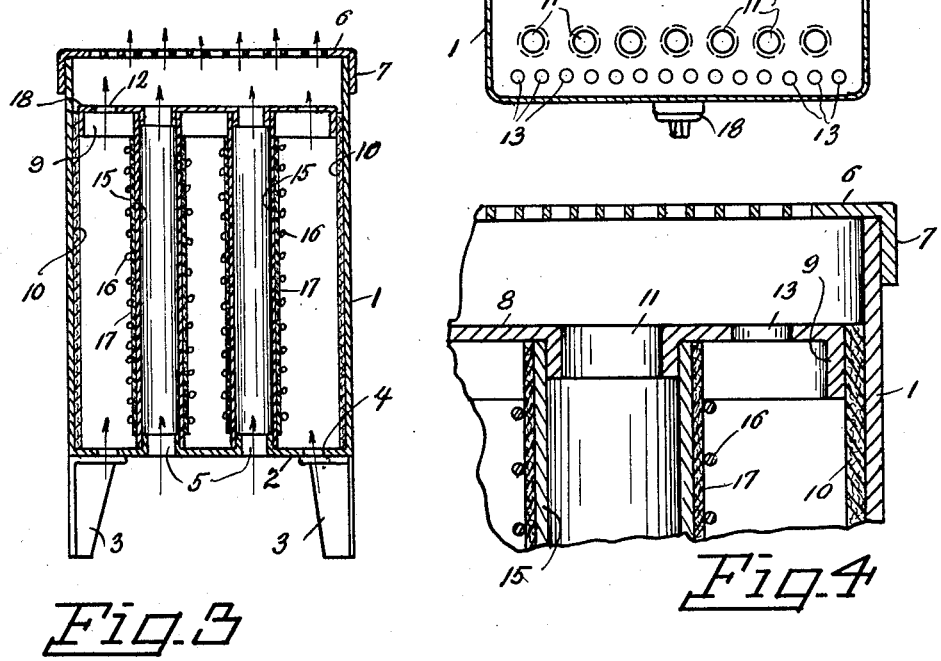
Fig.3
Fig.4
Inventor
Edward Van Schaack
By
Attorney Patented Dec. 18, 1945

2,391,207

UNITED STATES PATENT OFFICE 2,391,207

ELECTRIC HEATER

Edward Van Schaack, Spokane, Wash.

Application January 4, 1944, Serial No. 516,962

1 Claim. (Cl. 219—38)

This invention relates to an electric heater and it is one object of the invention to provide a heater including a casing or hollow body having therein an improved arrangement of air passages and heating coils so arranged that as air flows upwardly through the casing it will be warmed by the coils and delivered in heated condition from the top of the casing.

Another object of the invention is to provide a heater wherein the coils are disposed about tubes which have their ends fitting about necks carried by the bottom of the casing and by a plate or false top, the false top being supported upon the tubes and bordered by a flange which holds an asbestos lining for the casing in place.

Another object of the invention is to provide a heater which may be formed substantially entirely of sheet metal and thus cheaply manufactured and sold at low cost.

The invention is illustrated in the accompanying drawing, wherein:

Figure 1 is a perspective view of the improved electric heater.

Figure 2 is a sectional view taken horizontally through the heater on the line 2—2 of Figure 1.

Figure 3 is a vertical sectional view on the line 3—3 of Figure 1.

Figure 4 is a fragmentary sectional view on an enlarged scale showing more clearly the details of construction.

This heater has a casing or hollow body 1 formed of sheet metal or other suitable material and having a bottom 2 and feet 3 by which the casing is supported in elevated position so that air may flow upwardly through perforations 4 and also through hollow necks 5 projecting upwardly from the bottom. The open upper end of the casing is guarded by a grill 6 formed of perforated sheet metal and having a depending flange 7 which fits snugly about the casing so that it will be held in place but may be easily removed when necessary.

A false top or plate 8, formed of sheet metal, fits within the upper portion of the casing and is formed with a depending marginal flange 9 for engaging the upper portion of an asbestos lining 10 and holding the lining in close contacting engagement with the walls of the casing.

Necks 11 extend downwardly from the plate 8 in alinement with the necks 5 of the bottom 2 and, near its side edges, the plate is formed with lines of perforations 12 so that air entering the casing through the perforations 4 may flow outwardly through the openings 12 and out of the casing through the grill 6. Tubes 15 extend vertically in the casing with their upper and lower ends fitting snugly about the necks 11 and 5 of the plate 8 and the bottom 2, and, by reference to Figures 3 and 4 of the drawing it will be seen that the plate 8 rests upon the upper ends of the tubes and is thus supported in the casing. The heating coils 16 surround the tubes and are insulated therefrom by asbestos coverings 17 so that the coils will not be short circuited by contact with the tubes, a switch 18 being provided so that flow of current through the coils may be controlled. Since the necks are open at both ends, air may flow upwardly through the tubes as well as through the casing about the tubes and this air will be heated by contact with the tubes which are heated by heat transmitted to them through the asbestos coverings 17.

Having thus described the invention, what is claimed is:

In an electric heater, a casing open at its top and having a bottom formed with air inlet openings and provided with upstanding tubular necks open at their upper and lower ends, a grill constituting a perforated removable top for the casing and having a depending marginal flange fitting snugly about the casing, an asbestos lining for walls of said casing, a false top disposed within the casing in spaced relation to the open upper end thereof and having a depending marginal flange overlapping the upper portion of the lining and pressing said lining close against the walls of the casing, said false top being formed with air outlet openings and provided with depending tubular necks open at their upper and lower ends and alined with the necks of the bottom, tubes disposed vertically in said casing with their upper and lower end portions fitting about the necks of the bottom and false top and having their upper ends bearing against the under face of the false top to support same, insulation surrounding said tubes, and heating coils surrounding the insulated tubes for heating air flowing upwardly through the tubes and through the casing.

EDWARD VAN SCHAACK.